United States Patent
Choi et al.

(10) Patent No.: US 7,027,491 B2
(45) Date of Patent: Apr. 11, 2006

(54) INTERFERENCE CANCELLATION RECEIVER FOR USE IN A CDMA SYSTEM

(75) Inventors: In-Kyeong Choi, Taejon (KR); Seong Rag Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 752 days.

(21) Appl. No.: 10/022,731

(22) Filed: Dec. 20, 2001

(65) Prior Publication Data

US 2003/0067969 A1    Apr. 10, 2003

(30) Foreign Application Priority Data

Oct. 5, 2001    (KR) .............................. 2001-61537

(51) Int. Cl.
  *H04B 1/69* (2006.01)
  *H04B 1/707* (2006.01)
  *H04B 1/713* (2006.01)
(52) U.S. Cl. ...................... 375/148; 375/140; 375/147
(58) Field of Classification Search ................ 375/144, 375/148, 346, 349, 350; 370/342, 479
  See application file for complete search history.

(56) References Cited

U.S. PATENT DOCUMENTS 6,574,270 B1 * 6/2003 Madkour et al. ........... 375/148
6,580,771 B1 * 6/2003 Kenney ....................... 375/346
2003/0095590 A1 * 5/2003 Fuller et al. ................. 375/148

FOREIGN PATENT DOCUMENTS

KR    2000-78108    3/2000
KR    10-255565    5/2000

OTHER PUBLICATIONS

Kim, et al.; Multi-Mode Substractive Interference Cancellation For Asynchronous Multi-Path Channels.

* cited by examiner

*Primary Examiner*—Stephen Chin
*Assistant Examiner*—Erin M. File
(74) *Attorney, Agent, or Firm*—Mayer, Brown, Rowe & Maw LLP

(57) ABSTRACT

An interference cancellation receiver reduces the multiple access interference in a CDMA system. The receiver includes a demodulator for receiving a residual signal or a received signal from a calling terminal as an over-sample unit baseband spread signal and down-sampling the baseband spread signal on a chip basis to output a demodulation signal, a regenerator for performing a bit decision for the demodulation signal, regenerating signals through the channelization and scrambling and converting the regenerated signals to signals on the over-sample basis, an adder for summing up the over-sample unit signals, a filter for filtering the summed-up signal to output a band spread signal, a subtractor for subtracting the band spread signal from the received signal to output the residual signal and a delay for keeping timing with the residual signal by delaying the chip unit signals outputted from the regenerator.

10 Claims, 4 Drawing Sheets

INTERFERENCE CANCELLATION RECEIVER FOR USE IN A CDMA SYSTEM

FIELD OF THE INVENTION

The present invention relates to a code division multiple access (CDMA) system; and, more particularly, to a parallel interference cancellation receiver for implementing a multi-user detector, i.e., reducing the multiple access interference (MAI), in the CDMA system.

BACKGROUND OF THE INVENTION

A parallel interference cancellation scheme regenerates multi-user signals on a user basis and performs reference cancellation by subtracting regenerated interference signals from received signals, wherein the signals for the multi-users are transmitted in a mixed state.

Since a receiver of a CDMA system receives signals, which are coded by using a unique spread code in each terminal, transmitted through the same frequency band, mixed and, then, received through a channel, its performance is degraded by the multiple access interference (MAI) caused in de-spreading of the received signals.

Further, when subtracting a regenerated baseband signal for each path from a received baseband signal in order to cancel the MAI, the complexity of a system substantially varies according to a location of a band spread filter for converting the regenerated signal to the baseband signal.

A conventional parallel interference cancellation receiver has a drawback that its system complexity is comparatively high since it requires a pulse shaping filter for each finger when regenerating a signal for the interference cancellation. For instance, in case the number of multi-paths (i.e., the number of fingers in each detector) is L and the number of users (i.e., the number of detectors) is K, the number of base spread filters required to perform an S-stage interference cancellation becomes K*L*S.

In case of employing a band spread filter for each detector instead of using a pulse shaping filter for each finger in order to resolve the system complexity, there needs K*S filters and there still remains a complexity problem in case there are a number of users.

In order to solve the above problems, the prior art, 'CDMA multi-user interference canceller' (Japanese Patent No. Bei 10-24367) employed only one pulse shaping filter at each interference cancellation node by summing up the regenerated signal of each detector and then allowing the summed signal to pass through the pulse shaping filter.

Since, however, the prior art performs a subtraction process on a chip basis, it does not consider the case that user signals are asynchronous.

SUMMARY OF THE INVENTION

It is, therefore, a primary object of the present invention to provide an interference cancellation receiver capable of being processed over-sample basis for an asynchronous system as well as reducing the number of pulse shaping filters required in the signal regeneration for the subtraction in a multistage parallel interference receiver for reducing the MAI of a CDMA system.

Another object of the present invention is to provide a cyclic interference cancellation receiver capable of being employed in an asynchronous system as well as performing a multistage interference cancellation by using one hardware in a multistage parallel interference receiver for reducing the MAI of a CDMA system.

In accordance with the present invention, there is provided a receiver of a CDMA system employing a multiple access interference (MAI) cancellation apparatus, comprising the MAI cancellation apparatus includes a demodulator for receiving a residual signal or a received signal from a calling terminal as a baseband spread signal on an over-sample basis and down-sampling the baseband spread signal on from the over-sample basis to a chip basis to thereby output a demodulation signal, a regenerator for performing a bit decision for the demodulation signal, regenerating signals through the channelization and scrambling, and converting the regenerated signals to signals on the over-sample basis, an adder for summing up the signals on the over-sample basis, a pulse shaping filter for filtering the summed-up signal to thereby output a band spread signal, a subtractor for subtracting the band spread signal from the received signal to thereby output the residual signal and a delay for keeping timing with the residual signal by delaying the signals on the chip basis outputted from the regenerator, wherein the MAI cancellation apparatus generates the demodulation signal by summing up the residual signal down-sampled on the chip basis at the demodulator and the signals on the chip basis outputted from the delay.

In accordance with the present invention, it is possible to improve the system complexity by summing up all regenerated signals and making the summed signal pass through a pulse shaping filter. Further, the present invention can be applied in case of asynchronous user signals and enhance the performance of a receiver of the CDMA system by executing the subtraction on an over-sample basis and the channel estimation on a chip basis.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1A:
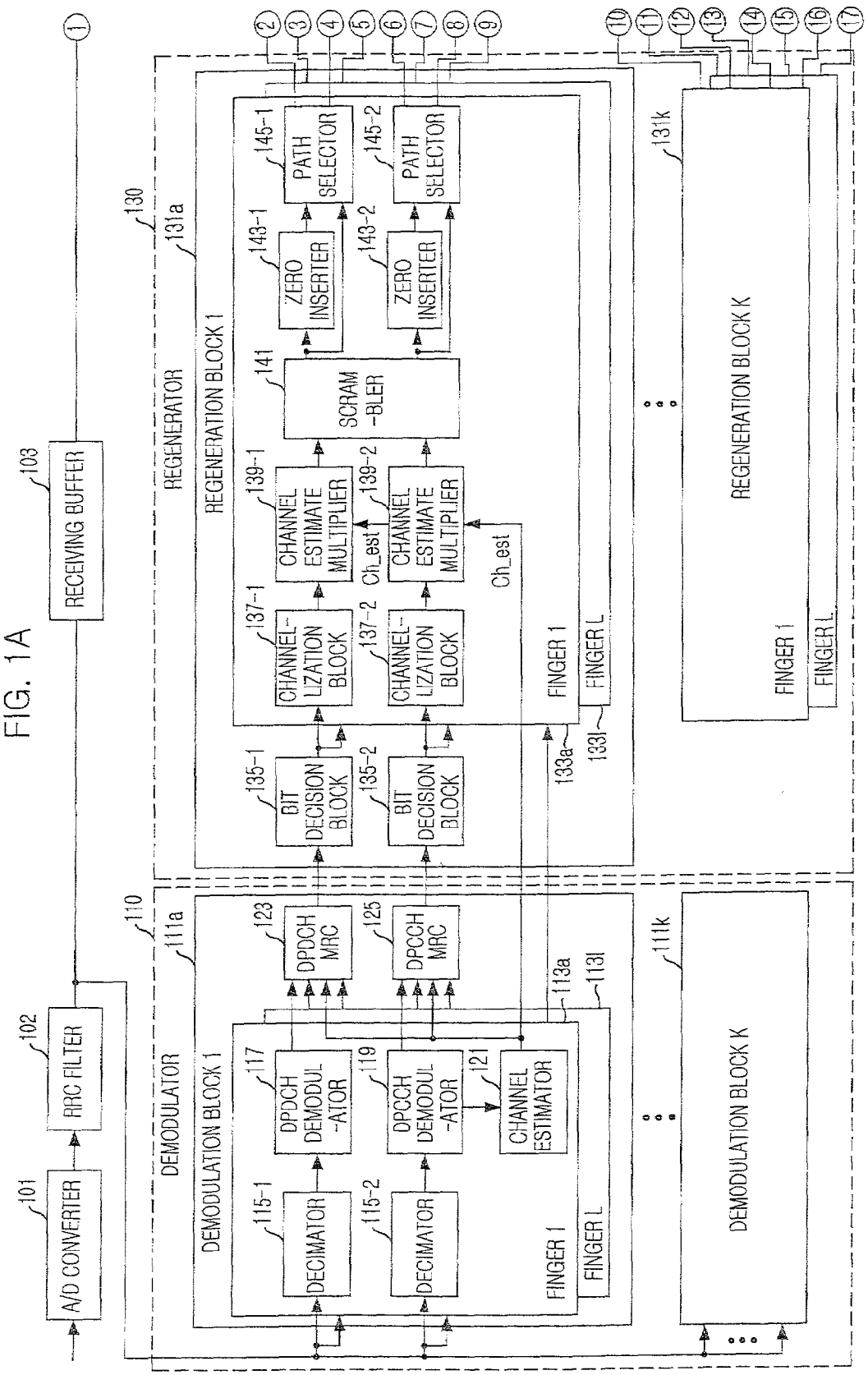
FIGS. 1A and 1B describe a block diagram of an interference cancellation receiver for the multistage parallel interference cancellation in accordance with an embodiment of the present invention.

Hereinafter, with reference to the accompanying drawings, some preferred embodiments of the present invention would be explained in detail. It should be noticed that, when assigning reference numerals to components illustrated in each drawing, components performing a same function are represented by an identical reference numeral although they are shown in different drawings.

Figure 1B:
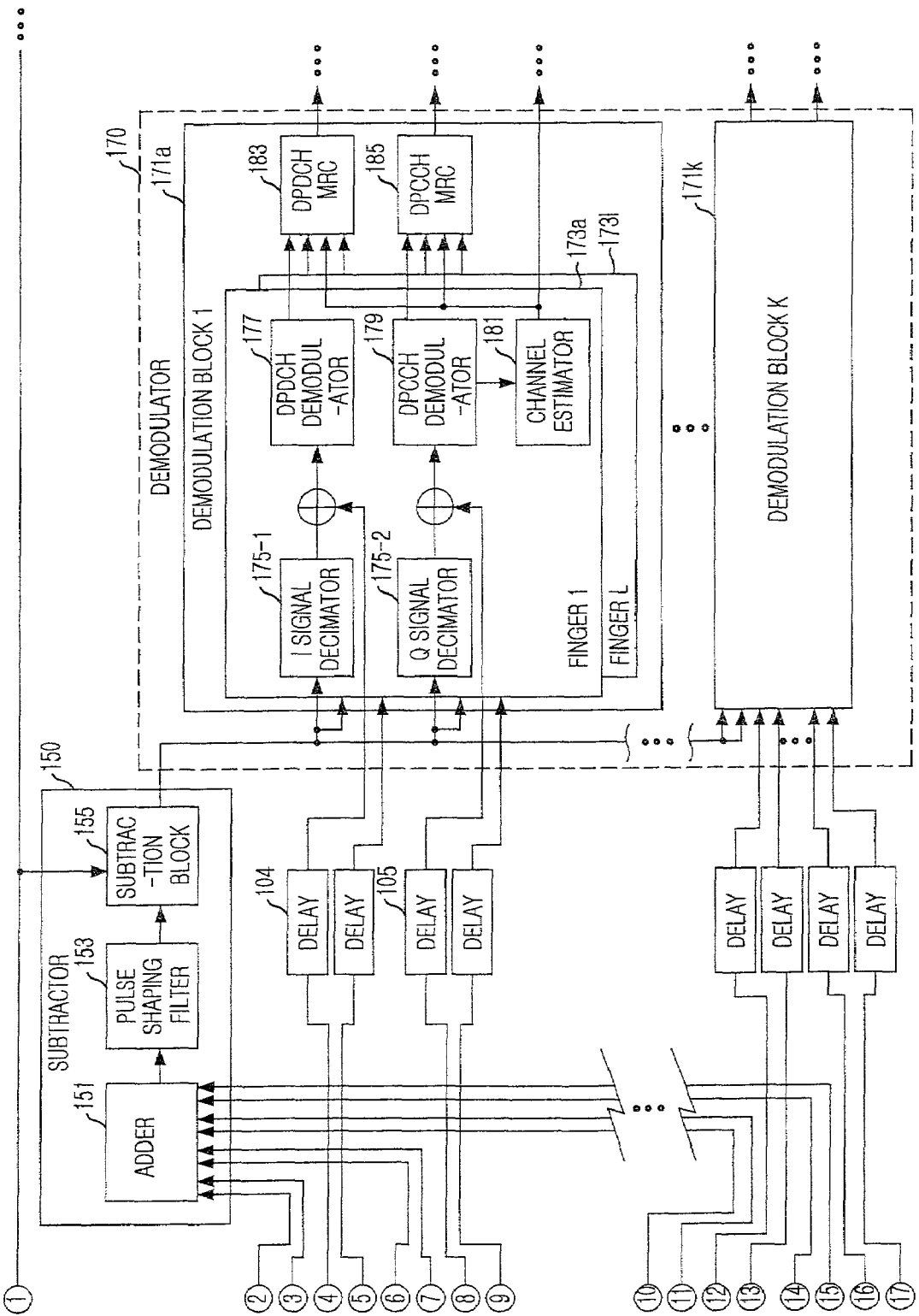

Referring to FIGS. 1A and 1B, there is shown a block diagram of an interference cancellation receiver for the multistage parallel interference cancellation in accordance with an embodiment of the present invention and its operation will be described herein below.

A received intermediate frequency (IF) signal is generated after a transmitted signal passes through a receiving antenna (not shown), a carrier demodulator (not shown) and an analog-digital (A/D) converter 101. Then, the received IF signal is converted to a baseband signal by a root raised cosine (RRC) filter 102 which is the same band spread filter as used when each terminal transmits signals. The baseband signal is stored in a receiving buffer 103 and, at the same time, inputted to demodulation blocks 111a to 111k in a demodulator 110.

The baseband signal inputted to each of the demodulation blocks 111a to 111k is coupled to each of fingers 113a to 113l. Herein, the K demodulation blocks 111a and 111k have a same configuration and the number of demodulation blocks is identical to that of users of a CDMA system employing an inventive interference cancellation receiver. Moreover, the fingers 113a to 113l of each of the demodulation block 111a to 111k have functions of demodulating L multi-path signals of each user.

Since the demodulation blocks 111a to 111k perform the same function, the description will center round the first modulation block 111a, a first regeneration block 131a of a regenerator 130, a subtractor 150 and a first demodulation block 171a of a demodulator 170, hereinafter.

An I/Q received signal on an over-sample basis, which is inputted to the fingers 113a to 113l of the first demodulation block 111a in parallel, is divided into an I signal and a Q signal and, then, provided to corresponding decimators 115-1 and 115-2 in parallel. I/Q output signals, which are down-sampled on a chip basis by the decimators 115-1 and 115-2, are de-scrambled and de-channelized by a dedicated physical data channel (DPDCH) demodulator 117 and a dedicated physical control channel (DPCCH) demodulator 119, respectively, thereby being demodulated to a data signal and a control signal for each path and coupled to a DPDCH maximum ratio combiner (MRC) 123 and a DPCCH MRC 125, respectively.

Meanwhile, a channel estimator 121 performs the channel estimation for each path by using a pilot signal outputted from the DPCCH demodulator 119 and provides a channel estimation value Ch_est to the DPDCH MRC 123 and the DPCCH MRC 125. The DPDCH MRC 123 and the DPCCH MRC 125 execute a maximum ratio combination soft bit decision for DPDCH bits and DPCCH bits by using two input values, i.e., the data/control signal for each path and the channel estimation values and supply the resulting value to a signal regenerator 130 so as to perform the received signal regeneration required for the subtraction.

The soft bit decision values of the demodulation blocks 111a to 111k, which are output values of the demodulator 110, are inputted in parallel to regeneration blocks 131a to 131k of the signal regenerator 130 and, then, a temporary bit decision is performed for the soft bit decision values by a bit decision blocks 135-1 and 135-2 for the DPDCH and the DPCCH of the signal regeneration blocks 131a to 131k. Herein, if the soft bit decision value is not a negative number, it is decided as 1 and, if otherwise, it is decided as −1.

The bit decision values determined by the bit decision blocks 135-1 and 135-2 are provided to the L fingers 133a to 133l of the first signal generation block 131a. The bit decision values inputted to the fingers 133a to 133l are de-spread through the same procedure as in a transmitter. First of all, the bit decision values are outputted on a chip basis after passing through channellization blocks 137-1 and 137-2, which spread the bit decision values by using a unique orthogonal variable spreading factor (OVSF) code assigned to each channel for the channelization. At this time, a code generator (not shown) generates the OVSF code.

In order to regenerate multi-path signals, channel estimate multipliers 139-1 and 139-2 multiply the channel estimation value Ch_est by the DPDCH and the DPCCH obtained by the channelization blocks 137-1 and 137-2, respectively. A DPDCH regeneration signal and a DPCCH regeneration signal acquired by the channel estimate multipliers 139-1 and 139-2 are supplied to a scrambler 141 to thereby sort users and then multiplied by a scrambling code produced by the code generator (not shown) to thereby output I/Q signals.

The I/Q signals outputted on the chip basis are inputted to zero inserters 143-1 and 143-2, which insert (the number of over-samples −1) number of 0s behind the I/Q signals on the chip basis to thereby output signals on the over-sample basis. Path selectors 145-1 and 145-2 choose signals to be participated in the subtraction among the multi-path signals. That is, after a rank order determinator (not shown) decides a rank order of the multi-path signals, the path selectors 145-1 and 145-2 determine whether or not outputting the multi-path signals according to their rank order. Since the rank order of signals in a finger is equally assigned for a corresponding I/Q channel, a path selector of the I/Q channel selects or unselects the I/Q signals at the same time. If all paths are selected, the interference cancellation receiver becomes a parallel interference cancellation receiver.

If selected, the selected signals passing through the zero selectors 143-1 and 143-2 are inputted to the subtractor 150 by considering a path delay and each user. On the other hand, I/Q signals on the chip basis, which do not pass through the zero selectors 143-1 and 143-2, are outputted through the path selector 145 as they are. This procedure is equally applied to all fingers 133a to 133l included in the signal regeneration blocks 131a to 131k of the signal regenerator 130.

The regeneration signals on the over-sample basis outputted from the signal regeneration blocks 131a to 131k of the signal regenerator 130 are coupled to the subtractor 150 for the interference cancellation and summed up at a regeneration signal adder 151. The summed signal outputted from the regeneration signal adder 151 passes through a pulse shaping filter 153. By summing up all of the regeneration signals and making them passing through the pulse shaping filter 153, the regeneration signals pass through the pulse shaping filter 153 only once for the 1-stage interference cancellation. This can achieve a simpler configuration than the prior art in which each of the regeneration signals passes through a pulse shaping filter, and reduce an amount of computation.

A subtraction block 155 subtracts an output value of the pulse shaping filter 153 from the received signal stored in the receiving buffer 103. The subtraction block 155 only outputs a difference between the received signal and the selected regeneration signal and a Gaussian noise signal as residual signals.

The I/Q residual signals are provided to the demodulation blocks 171a to 171k of the demodulator 170 in parallel regardless of whether the regeneration signals are selected or not and, then, down-sampled on the chip basis by I/Q signal decimators 175-1 and 175-2 in each of fingers 173a to 173l.

Output values of the decimators 175-1 and 175-2 are signals on the chip basis including chip asynchronous information provided to each user. In order to demodulate the signals unselected by the path selector 145-1 and 145-2, there is performed the same procedure as in the demodulator 110 by using the residual signals as the received signal.

In the meantime, since the selected regeneration signals are subtracted at the subtractor 155 so as to demodulate the signals selected by the path selectors 145-1 and 145-2, the residual signals are added by a regeneration signal for each path and then there is performed the bit decision of the signals for each path. For this, the I/Q signals on the chip basis outputted from the signal regeneration blocks 131a to 131l of the signal regenerator 130 pass through delays 104 and 105 so as to keep timing with the residual signals and, then, provided to their corresponding fingers 173a to 173l in the first demodulation block 171a.

An I residual signal down-sampled on the chip basis by an I signal decimator 175-1 of each finger is combined with a delayed signal of an I regeneration signal and then inputted to a DPDCH demodulation block 177. On the other hand, a Q residual signal down-sampled on the chip basis by a Q signal decimator 175-2 are combined with a delayed signal of a Q regeneration signal and then provided to the DPCCH demodulation block 179. The next procedure is the same as in the demodulator 110.

As described above, since the bit decision is executed after most or all of the path signals are removed through the interference cancellation procedure, a more accurate decision can be performed. A final bit decision is accomplished by a hard decision after a DPDCH MRC 183 and a DPCCH MRC 185.

Figure 2A:
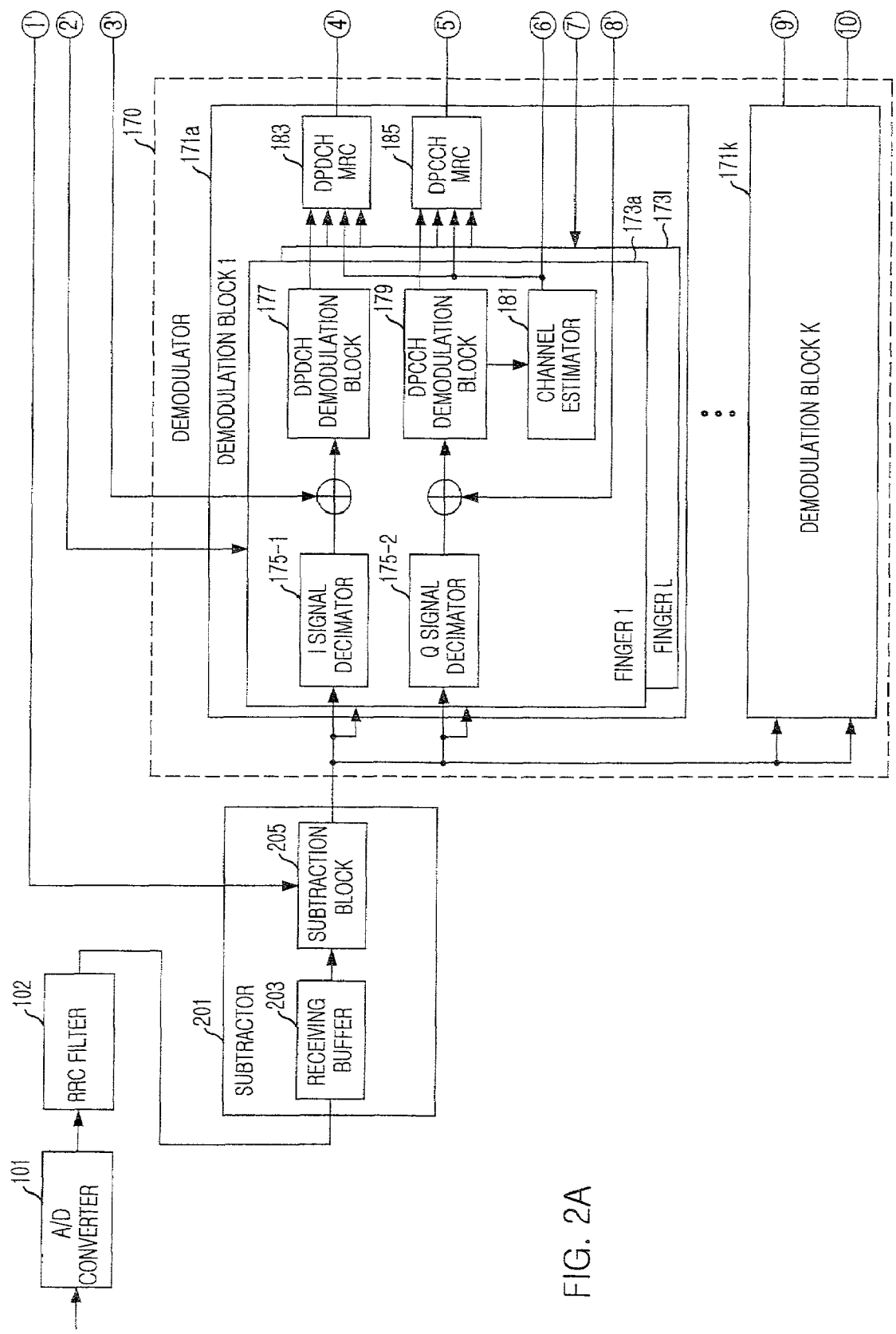
FIGS. 2A and 2B illustrate a block diagram of a cyclic interference cancellation receiver for the multistage parallel interference cancellation in accordance with an embodiment of the present invention.
Figure 2B:
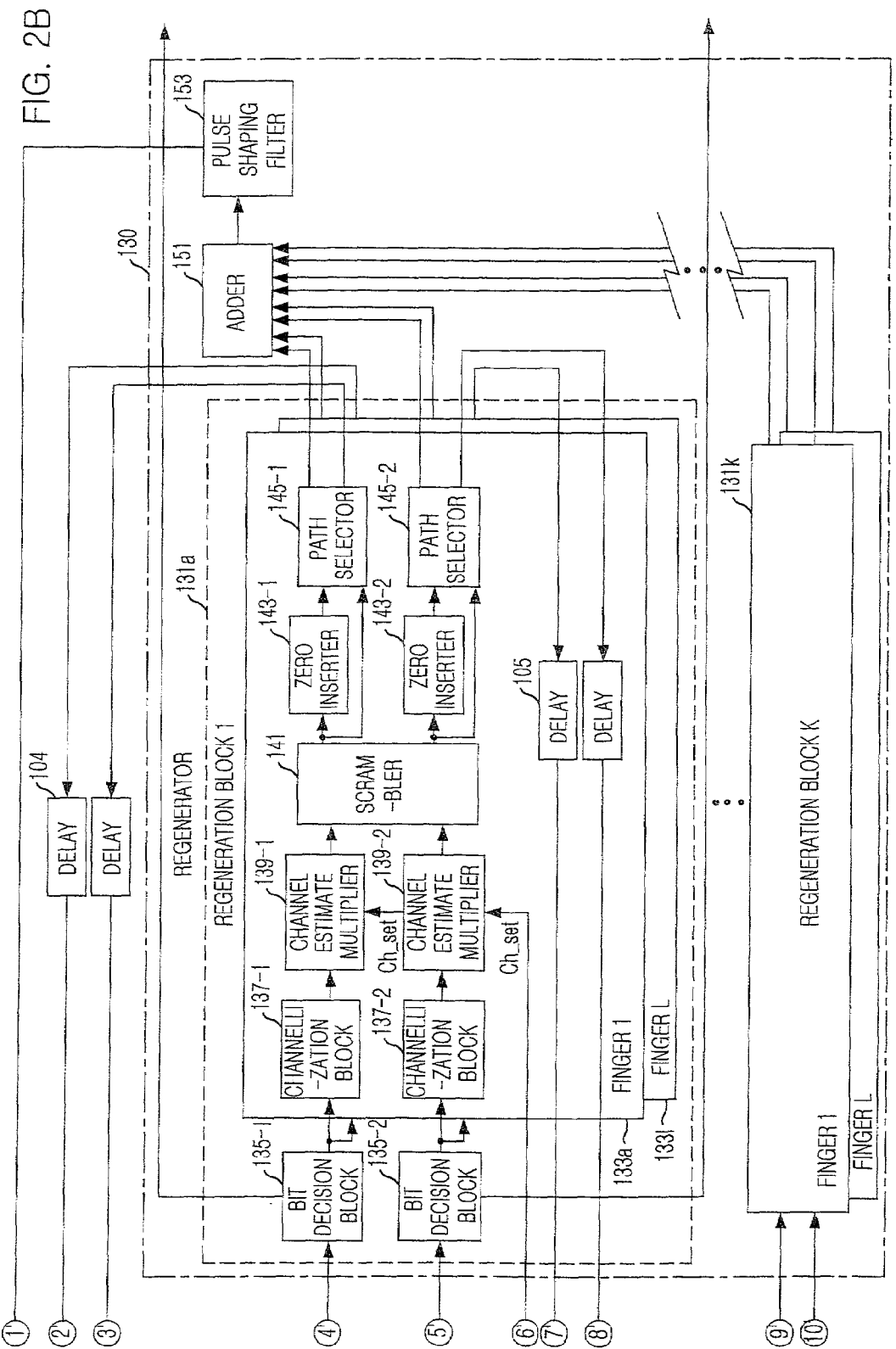

Referring to FIGS. 2A and 2B, there is illustrated a block diagram of a cyclic interference cancellation receiver for the multistage parallel interference cancellation in accordance with an embodiment of the present invention.

A received intermediate frequency (IF) signal is generated as described in the procedure explained with reference to FIGS. 1A and 1B and then converted to a baseband signal by a root raised cosine (RRC) filter 102 which is the same band spread filter as used when each terminal transmits signals. The baseband signal is stored in a receiving buffer 203 of a subtractor 201. The baseband signal stored in the receiving buffer 203 is provided to demodulation blocks 171a to 171k in a demodulator 170 in parallel and inputted to each of fingers 173a to 173l of each of the demodulation blocks 171a to 171k.

Herein, the K demodulation blocks 171a and 171k have the same configuration and the number of demodulation blocks is identical to that of users of a CDMA system employing an inventive interference cancellation receiver. Further, the fingers 173a to 173l of each of the demodulation block 171a to 171k have functions of demodulating L multi-path signals of each user.

Since the demodulation blocks 171a to 171k perform the same function, the description will center round the first modulation block 171a and a first regeneration block 131a of a regenerator 130, hereinafter.

I/Q received signals on the over-sample basis, which are inputted to the fingers 173a to 173l of each of the demodulation blocks 171a to 171k in parallel, are coupled to I/Q signal decimators 175-1 and 175-2 in parallel. The I/Q output signals down-sampled on the chip basis by the decimators 175-1 and 175-2 are combined with the I/Q signals which are outputted from path selectors 145-1 and 145-2 of a signal regenerator 130 and delayed by delays 104 and 105, and the combined signals are coupled to a DPDCH demodulator 177 and a DPCCH demodulator 170. The next procedure is the same as in the demodulator 170 of FIG. 1B.

That is, the I/Q output signals down-sampled by the decimators 175-1 and 175-2 are demodulated to a data signal and a control signal by de-scrambled and de-channelized by the DPDCH demodulator 177 and the DPCCH demodulator 179 and the data signal and the control signal are inputted to a DPDCH MRC 183 and a DPCCH MRC 185, respectively.

Meanwhile, a channel estimator 181 performs the channel estimation for each path by using a pilot signal outputted from the DPCCH demodulator 179 and provides a channel estimation value Ch_est to the DPDCH MRC 183 and the DPCCH MRC 185. The DPDCH MRC 183 and the DPCCH MRC 185 execute a maximum ratio combination soft bit decision for DPDCH bits and DPCCH bits by using two input values, i.e., the data/control signal for each path and the channel estimation value, and supply the resulting value to a signal regenerator 130 so as to perform the received signal regeneration required for the subtraction.

The soft bit decision values of the demodulation blocks 171a to 171k, which are output values of the demodulator 170, are inputted in parallel to regeneration blocks 131a to 131k of the signal regenerator 130 and, then, a temporary bit decision is performed for the soft bit decision values by a bit decision blocks 135-1 and 135-2 for the DPDCH and the DPCCH of the signal regeneration block 131a to 131k. Herein, if the soft bit decision value is not a negative number, it is decided as 1 and, if otherwise, it is decided as −1.

The bit decision values determined by the bit decision blocks 135-1 and 135-2 are provided to the L fingers 133a to 133 of the first signal generation block 131a. The bit decision values inputted to the fingers 133a to 133l are de-spread through the same procedure as in a transmitter. First of all, the bit decision values are outputted on a chip basis after passing through channellization blocks 137-1 and 137-2, which spread the bit decision values by using a unique orthogonal variable spreading factor (OVSF) code assigned to each channel for the channelization. At this time, a code generator (not shown) generates the OVSF code.

In order to regenerate multi-path signals, channel estimate multipliers 139-1 and 139-2 multiply the channel estimation value Ch_est by the DPDCH and the DPCCH obtained by the channelization blocks 137-1 and 137-2, respectively. A DPDCH regeneration signal and a DPCCH regeneration signal acquired by the channel estimate multipliers 139-1 and 139-2 are supplied to a scrambler 141 to thereby sort users and then multiplied by a scrambling code produced by the code generator (not shown) to thereby output I/Q signals.

The I/Q signals outputted on the chip basis are inputted to zero inserters 143-1 and 143-2, which insert (the number of over-samples −1) number of 0s behind the I/Q signals on the chip basis to thereby output signals on the over-sample basis. Path selectors 145-1 and 145-2 choose signals to be participated in the subtraction among the multi-path signals. That is, after a rank order determinator (not shown) decides a rank order of the multi-path signals, the path selectors 145-1 and 145-2 determine whether or not outputting the multi-path signals according to their rank order. Since the rank order of signals in a finger is equally assigned for a corresponding I/Q channel, a path selector of the I/Q channel selects or unselects the I/Q signals at the same time. If all paths are selected, the interference cancellation receiver becomes a parallel interference cancellation receiver.

If selected, the selected signals on the over-sample basis passing through the zero selectors 143-1 and 143-2 are inputted to a regeneration signal adder 151 by considering a path delay and each user. On the other hand, I/Q signals on the chip basis, which do not pass through the zero selectors 143-1 and 143-2, are outputted through the path selector 145 as they are. This procedure is equally applied to all fingers 133a to 133l included in the signal regeneration blocks 131a to 131k of the signal regenerator 130.

The regeneration signals on the over-sample basis outputted from the signal regeneration blocks 131a to 131k of the signal regenerator 130 are summed up at the regeneration signal adder 151. The summed signal outputted from the regeneration signal adder 151 passes through a pulse shaping filter 153. By summing up all of the regeneration signals and making them passing through the pulse shaping filter 153, the regeneration signals pass through the pulse shaping filter 153 only once for the 1-stage interference cancellation. This can achieve a simpler configuration than the prior art in which each of the regeneration signals passes through a pulse shaping filter, and reduce an amount of computation.

The data outputted from the regeneration signal adder 151 pass through the pulse shaping filter 153 and, then, fed back to a subtraction block 205 in the subtractor 201. The subtraction block 205 of the subtractor 201 subtracts the regeneration signals. The subtraction block 205 only outputs a difference between the received signal stored in the buffer 203 and the selected regeneration signal and a Gaussian noise signal as residual signals.

The I/Q residual signals are provided to the demodulation blocks 171a to 171k of the demodulator 170 in parallel regardless of whether the regeneration signals are selected or not and, then, down-sampled on the chip basis by I/Q signal decimators 175-1 and 175-2 in each of fingers 173a to 173l.

Output values of the decimators 175-1 and 175-2 are signals on the chip basis including chip asynchronous information provided to each user. In order to demodulate the signals unselected by the path selector 145-1 and 145-2, there is performed the same procedure as in the demodulator 170 by using the residual signals as the received signal.

In the meantime, since the selected regeneration signals are subtracted at the subtractor 205 so as to demodulate the signals selected by the path selectors 145-1 and 145-2, the residual signals are added by a regeneration signal for each path and then there is performed the bit decision of the signals for each path. For this, the I/Q signals on the chip basis outputted from the signal regeneration blocks 131a to 131l of the signal regenerator 130 pass through delays 104 and 105 so as to keep timing with the residual signals and, then, provided to their corresponding fingers 173a to 173l in the first demodulation block 171a.

An I residual signal down-sampled on the chip basis by an I signal decimator 175-1 of each finger is combined with an I regeneration signal delayed by the delay 104 and then inputted to a DPDCH demodulation block 177. On the other hand, a Q residual signal down-sampled on the chip basis by the Q signal decimator 175-2 are combined with a Q regeneration signal delayed by the delay 105 and then provided to the DPCCH demodulation block 179. In case the subtraction is not performed and the first received signal is inputted to the fingers, the data becomes 0 since there are considered the delays 104 and 105 from the path selectors 145-1 and 145-2.

The above procedure can be equally applied to all of the fingers 133a to 133l in the signal generator 130 and, since the bit decision is executed when most or all of the path signals are removed through the interference cancellation procedure, a more accurate decision can be performed. A final bit decision is accomplished by a hard decision performed at a bit decision block 135 of the first signal generation block 131a after a DPDCH MRC 183 and a DPCCH MRC 185 and then a DPDCH bit decision value and a DPCCH bit decision value are outputted.

FIGS. 2A and 2B show a configuration of a cyclic interference cancellation receiver capable of performing the multistage interference cancellation, which has an advantage of substantially reducing the hardware complexity compared with that described in FIGS. 1A and 1B.

As illustrated above, in accordance with the present invention, it is possible to simplify the configuration of the parallel interference cancellation receiver by summing up all regeneration signals prior to being passed through the band spread filter when regenerating the received signal for the interference cancellation. Further, the present invention can be applied to asynchronous systems by regenerating and subtracting signals on the over-sample basis.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What invention claimed is:

1. A receiver of a Code Division Multiple Access (CDMA) system employing a multiple access interference (MAI) cancellation apparatus, comprising:
the MAI cancellation apparatus comprising:
demodulating means for receiving a residual signal or a received signal from a calling terminal as a baseband spread signal on an over-sample basis and down-sampling the baseband spread signal from the over-sample basis to a chip basis to thereby output a demodulation signal;
regenerating means for performing a bit decision for the demodulation signal, regenerating signals through the channelization and scrambling, and converting the regenerated signals to signals on the over-sample basis and the chip basis;
adding means for summing up the signals on the over-sample basis;
pulse shaping filtering means for filtering the summed-up signal to thereby output a band spread signal;
subtracting means for receiving the received signal and subtracting the band spread signal from the received signal to thereby output the residual signal; and
delay means for keeping timing with the residual signal by delaying, on the chip basis, the signals outputted from the regenerating means,
wherein the MAI cancellation apparatus generates the demodulation signal by summing up the residual signal down-sampled on the chip basis at the demodulating means and the signals on the chip basis outputted from the delay means.

2. The receiver of the CDMA system as recited in claim 1, wherein the MAI cancellation apparatus further includes buffering means for storing the received signal and outputting the stored signal to the subtracting means.

3. The receiver of the CDMA system as recited in claim 2 comprising:
a plurality of MAI cancellation apparatuses,
wherein a succeeding MAI cancellation apparatus receives as input signals a residual signal outputted from a subtracting means, a signal on the chip basis outputted from a delay means and the received signal outputted from a buffering means of a previous MAI cancellation apparatus.

4. The receiver of the CDMA system as recited in claim 2, wherein, in the MAI cancellation apparatus, the residual signal outputted from the subtracting means is inputted to the demodulating means and the delayed signals on the chip basis outputted from the delay means are fed back to the demodulating means.

5. The receiver of the CDMA system as recited in claim 1, wherein the demodulating means contains demodulators as many as the number of users of the CDMA system and the regenerating means has regenerators as many as the number of users of the CDMA system.

6. The receiver of the CDMA system as recited in claim 5, wherein the demodulator has:
- I signal/Q signal decimators for down-sampling an I channel signal and a Q channel signal of the received signal or the residual signal, outputted from the subtracting means, to signals on the chip basis, respectively;
- a dedicated physical data channel (DPDCH) demodulator for demodulating a data signal from a signal outputted from the I signal decimator;
- a dedicated physical control channel (DPCCH) demodulator for demodulating a control signal from a signal outputted from the Q signal decimator;
- a channel estimator for outputting a channel estimation value per path from a pilot signal outputted from the DPCCH demodulator;
- a DPDCH maximum ratio combiner for receiving the demodulated data signal and the channel estimation value per path and outputting a maximum ratio combination bit decision value of a dedicated physical data channel bit; and
- a DPCCH maximum ratio combiner for receiving the demodulated control signal and the channel estimation value per path and outputting a maximum ratio combination bit decision value of a dedicated physical control channel bit.

7. The receiver of the CDMA system as recited in claim 6, wherein the demodulator has I signal/Q signal decimators, DPDCH demodulators, DPCCH demodulators and channel estimators as many as the number of multi-paths of each user.

8. The receiver of the CDMA system as recited in claim 7, wherein the regenerator has:
- DPDCH bit deciding means for receiving the maximum ratio combination bit decision value of the dedicated physical data channel bit and performing a bit decision;
- DPCCH bit deciding means for receiving the maximum ratio combination bit decision value of the dedicated physical control channel bit and executing a bit decision;
- channelization means for spreading the decision values of the DPDCH bit deciding means and the DPCCH bit deciding means by using a unique spread code per channel;
- channel estimation multiplier for outputting a dedicated physical data channel regeneration signal and a dedicated physical control channel regeneration signal by multiplying the channel estimation value with the spread signal outputted form the channelization means;
- scrambling means for an I signal and a Q signal on the chip basis by multiplying the dedicated physical data channel regeneration signal and the dedicated physical control channel regeneration signal with a scramble code for sorting users;
- zero inserting means for converting the I signal and the Q signal to signals on the over-sample basis and outputting the converted signals; and
- path selecting means for outputting the I signal and the Q signal on the over-sample basis to the adding means and providing the I signal and the Q signal on the chip basis to the delay means.

9. The receiver of the CDMA system as recited in claim 8, wherein the zero inserting means converts the I signal and the Q signal on the chip basis to the signals on the over-sample basis by inserting (the number of over-samples −1) number of zeros to the I signal and the Q signal on the chip basis.

10. The receiver of the CDMA system as recited in claim 8, wherein the DPDCH bit deciding means performs the bit decision by setting as 1 if the maximum ratio combination bit decision value of the dedicated physical data channel bit is not a negative number and performing a bit decision and −1 if otherwise and the DPCCH bit deciding means executes the bit decision by determining as 1 if the maximum ratio combination bit decision value of the dedicated physical control channel bit is not a negative number and −1 if otherwise.

* * * * *